United States Patent Office 2,782,465
Patented Feb. 26, 1957

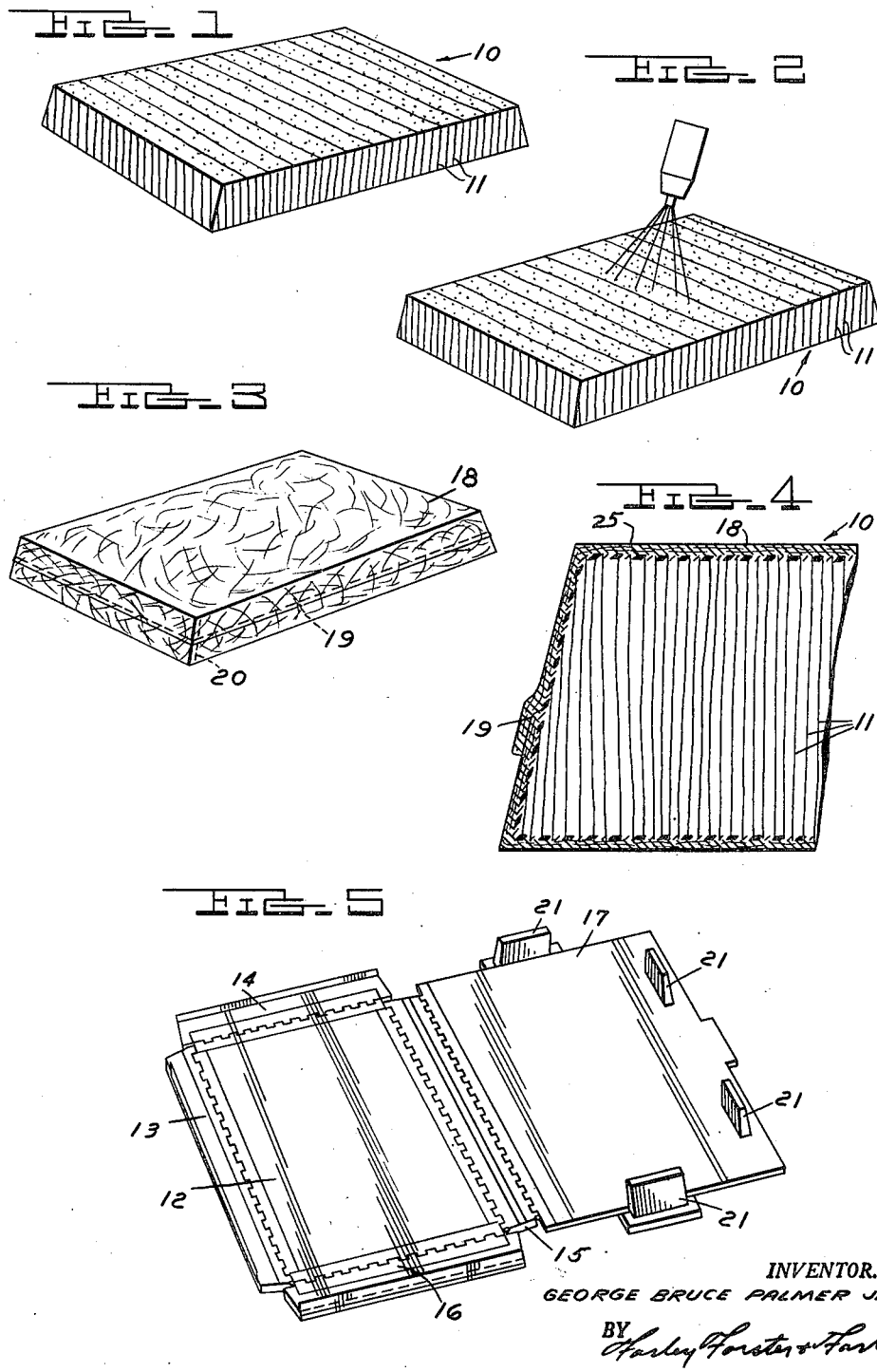

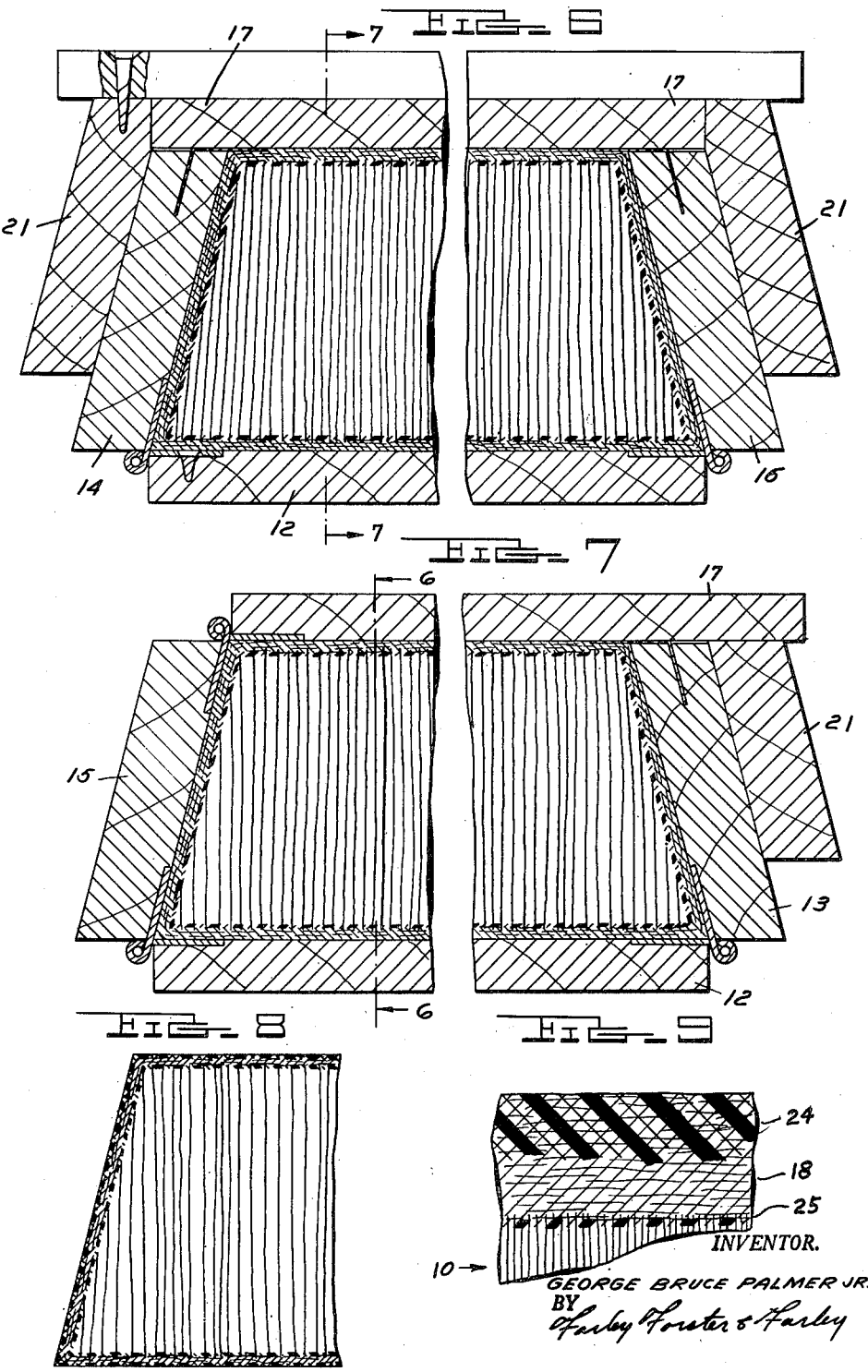

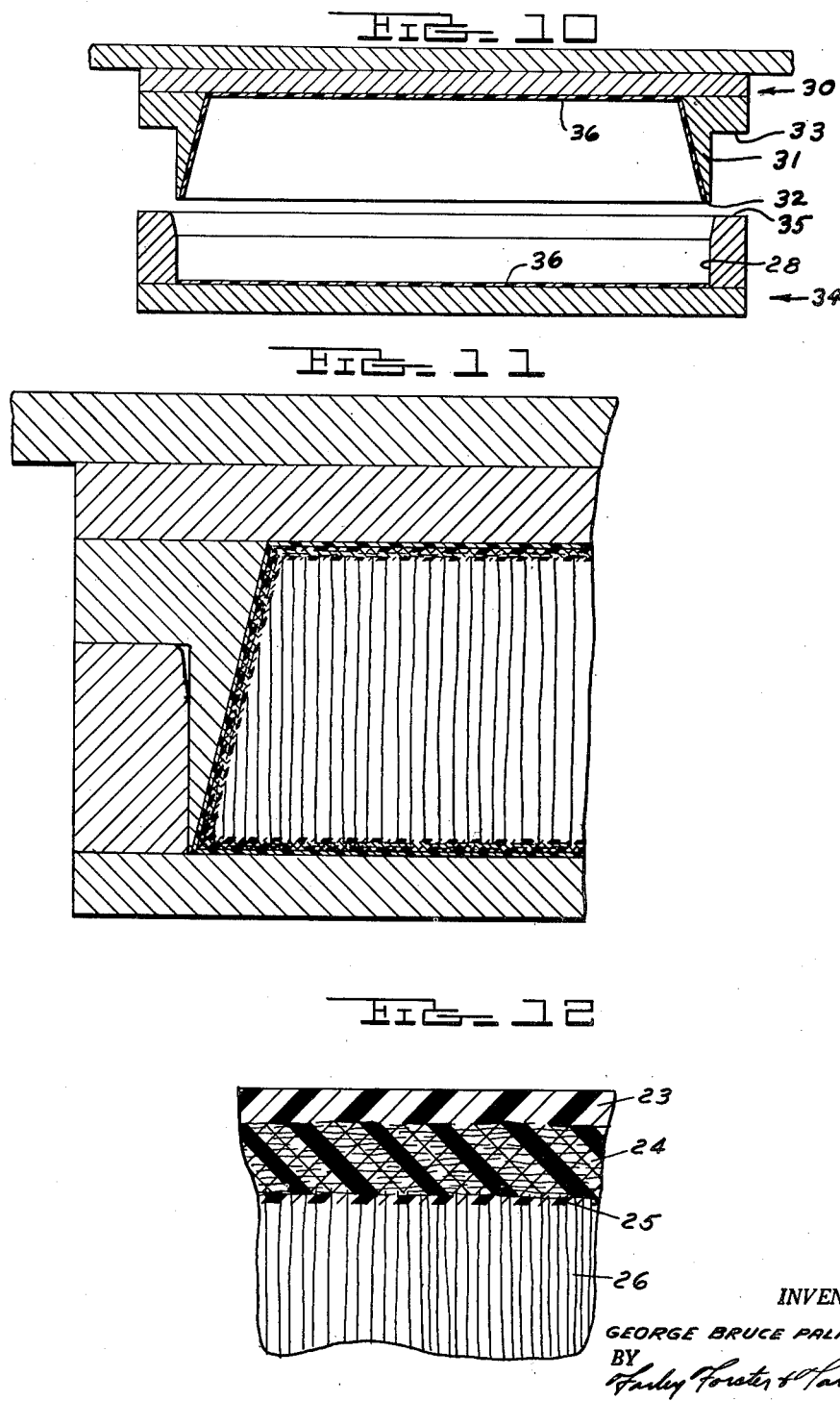

2,782,465

PLASTIC COVERED INSULATION PRODUCT AND METHOD FOR PRODUCING SAME

George Bruce Palmer, Jr., Grosse Pointe, Mich.

Application November 25, 1953, Serial No. 394,347

9 Claims. (Cl. 20—35)

This invention relates to a plastic coated insulation product and a method for manufacturing the same.

The desirable insulating properties of permeable fibrous materials such as glass fiber are well known. In typical applications such material is inserted between enameled steel walls of stoves, refrigerators, and the like. Containers so constructed are heavy, expensive and they do not provide a completely leakproof envelope for the insulating material. Frequently moisture condensation within the insulation causes it with long use to pack down into the lower portion of the compartment impairing the insulation efficiency of the structure. The present invention is directed to overcome these deficiencies and to provide a light integral construction for an insulation product wherein a permeable fibrous insulating core such as glass fiber is completely enveloped by and united with a smooth reinforced plastic cover providing finished product durability and appearance. While plastic coatings have been applied to numerous relatively rigid and impermeable cellular materials such as wood, it has previously been thought impracticable to directly coat an open permeable fibrous insulation material with a smooth plastic cover since the inherent instability and structural weakness of fibrous insulating materials such as glass fiber have been generally thought to provide an inadequate base for a thin plastic coating in the manufacture of major insulation components subjected to impact and other loads incurred in normal use.

The preferred embodiment of the present invention comprehends an insulating core of permeable glass fiber batt material having parallel fibers extending through from face to face normal to the major plane of the product, a reinforcing glass fiber mat having multidirectional fibers in the plane of the product surface completely enveloping such core with overlapping marginal edges and interengaging the end grain thereof, a hard thermosetting plastic coating impregnating and bonding the mat fibers to the surface of said core, and a hard suitably pigmented thermosetting plastic overlay integrally united with and concealing the reinforcing mat to provide a smooth uniform finish molded insulation product capable of direct use as an exposed major component of a refrigerator, stove or like insulating unit.

I have found that glass fiber batt material, while having no appreciable strength per se, is relatively less compressible in a direction parallel to fiber extension than in other directions and that when completely confined within and anchored to a reinforced plastic envelope with the core fibers extending continuously between and normal to the major faces, the resulting product has sufficient stability and strength for direct use as door or wall components in insulating units.

I have further found a method for molding such product to an accurate uniform finished size utilizing the compressible resilience of an oversize fibrous core material together with the application of liquid plastic to the exterior surface of a fibrous reinforcing mat wrapped around such core to develop an intimate uniform contact of the plastic with the mold surfaces and complete bonding of the mat fibers with each other and to the surface of the core resulting in a smooth imperforate exterior plastic surface free of any trapped or surface air pockets or other surface defects.

Accordingly it is an object of the present invention to provide an insulation product in which a permeable fibrous core is completely enveloped and sealed in an impermeable plastic covering.

Another object is to provide a plastic coated insulation product employing a permeable glass fiber core having parallel fibers extending continuously from face to face substantially normal to the major plane of the product with the ends of said fibers securely anchored in a thin plastic cover.

Another object is to incorporate in said plastic cover a fibrous reinforcing mat completely enveloping said core with overlapping marginal edges and interengaging the end fibers of the core.

Another object is to incorporate a plastic overlay integrally united with and concealing said reinforcing mat.

Another object is to provide a method and suitable apparatus for making such product.

These and other objects will be more apparent from the following detailed description of a preferred embodiment of my invention and from the drawings showing progressive stages in the manufacture of such product and the equipment utilized therein in which drawings:

Fig. 1 is a perspective view of a glass fiber core for a typical insulation product.

Fig. 2 is a similar view showing the step of spraying an adhesive coating on said core.

Fig. 3 is a similar view showing such core covered with a glass fiber mat.

Fig. 4 is an enlarged fragmentary sectional view of the core and covering mat.

Fig. 5 is a perspective view of a hinged preform mold in open position.

Fig. 6 is an enlarged sectional view of such mold in closed position with the insulation core and covering mat therein taken along the line 6—6 of Fig. 7.

Fig. 7 is a similar view taken along the line 7—7 of Fig. 6.

Fig. 8 is a fragmentary sectional view of the insulation core and covering mat after removal from the preform mold and application of a liquid plastic coating to the exterior surface thereof.

Fig. 9 is an enlarged fragmentary view showing the partial penetration of the liquid plastic material into the surface of the glass fiber mat prior to final molding.

Fig. 10 is a sectional view of a final mold with a plastic overlay applied to the surface thereof.

Fig. 11 is an enlarged fragmentary view of such mold in closed position with the insulation product therein.

Fig. 12 is a further enlarged fragmentary sectional view of the plastic coated surface of the final insulation product after curing and removal from the mold.

Referring to Fig. 1, a fabricated glass fiber core 10 is prepared in approximately the final shape and size of the finished product. Such core may be prepared by stacking commercially available glass fiber batts having parallel fibers extending in a longitudinal direction to a height corresponding to one of the major dimensions of the piece and then cutting through said stacked batts, as with a band saw, in a direction normal to the fibers to provide slabs of a thickness corresponding to the minor dimension of the part. The resulting rectangular slabs of core material may then be further cut and trimmed, also by saw, to provide any desired bevel for the edge surfaces corresponding to the finished size and shape of the end product. While such slab has no appreciable strength, the glass fiber batts as commercially produced with a phenolic resin binder are sufficiently coherent to retain their shape in normal handling, and when the batts are stacked together with an additional adhesive binder between adjacent surfaces they may be cut to size and the resulting laminated batt glass fiber core as shown in Fig. 1 may be picked up or otherwise handled as required in the succeeding operations of spraying as shown in Fig. 2 and covering with a reinforcing mat as shown in Fig. 3.

In the spraying operation the entire surface of the core is sprayed with a liquid adhesive coating 25 in sufficient quantity to wet the reinforcing glass mat or cloth which is next wrapped around the core and retain such mat temporarily in position for handling in the condition shown in Fig. 3 but not in such quantity as to saturate the mat or create an impermeable layer upon subsequent curing or drying. In this connection it will be understood from an examination of Fig. 4 that if the glass mat is applied to the surface of the glass fiber core with a slight pressure the end fibers of the core will project into and interengage with the glass fibers of the outer mat and that if such respective materials are so held during curing or drying of the adhesive, as well as during subsequent curing of the plastic later applied to the mat, the ends of each fiber in the core will be effectively anchored in the adjacent surface of the plastic impregnated glass mat so that the entire surface of the glass fiber core will be effectively bonded to the relatively rigid glass mat reinforced plastic envelope thereby rendering the core capable of providing some internal support and dimensional stability to the outer relatively thin plastic cover.

In order to obtain a uniform shape and the necessary contact pressure between the glass fiber mat and core surfaces to assure such interengagement of fibers during the setting of the adhesive, a preform mold such as disclosed in Fig. 6 is preferably employed. Such mold may consist of a bottom 12, hinged sides 13, 14, 15 and 16, and a hinged top 17. In preparation for wrapping the core 10 with the glass fiber mat 18, such mat is preferably precut to a form which will permit it to completely envelop the core and provide overlapping marginal edges as shown in Fig. 5 and placed over the open mold whereupon the core coated with liquid adhesive may be placed on the mat over the bottom section 12. The hinged sides 14 and 16 may then be moved up thus folding these adjacent flaps of the mat against the core; front corner flaps may next be tucked in place and hinged side 13 folded up bringing this flap into contact with the core; similarly, the side 15 and the top 17 may next be closed, guide blocks 21 serving to hold the respective sides of the mold in position. If an air drying adhesive is employed, the preform mold may consist of simple wooden elements as shown and the wrapped core may be left in the mold while the adhesive hardens at room temperature. However, in order to reduce setting time, a thermosetting plastic adhesive may be employed and the preform mold heated in an oven or by built-in heating elements by which means the adhesive may be curved and the mat covered core removed from the mold in as short a time as two minutes or less.

After the adhesive has set and the mat covered core has been removed from the preform mold, the inner face of the glass fiber mat will be sufficiently bonded to the core for handling in subsequent operations while the outer surface of the mat will include an open network of glass fibers. Such outer surface is next sprayed with a liquid plastic preferably a thermosetting plastic mixed with appropriate fillers, pigments and catalysts to provide desired physical properties as later described in detail. Such plastic is sprayed on the outer surface of the mat in sufficient quantity to provide a continuous film of plastic across such outer surface and partially permeate the mat as shown at 24 in Fig. 9 although it is not desirable at this stage to saturate the mat throughout its entire depth since complete saturation of the mat should result only by compressing the mat in the final mold.

After such adhesive spraying the article is next placed in the lower half of a finished product mold such as shown in Figs. 10 and 11 which includes an upper mold half 30 containing beveled portions 31 leading to a relatively sharp lower edge 32 and having a shoulder 33 for engaging the lower mold half 34 which is in turn provided with close fitting guide surfaces 28 and an upper ledge 35 for registering with the upper mold half. Such mold operates effectively to seal in the plastic and compress any surplus inwardly into the permeable core assuring complete saturation of the mat. The mold is preferably heated to a temperature suitable for curing the plastic by built-in heating elements, not shown, and constructed with polished metal surfaces. It is prepared for each molding operation by removing any residue plastic from the prior application with a scraper, steel wool and solvent after which a release compound is initially applied to the metal mold surface. Lethicin, paraffin or vegetable waxes, or colloidal suspensions of graphite are suitable for this purpose.

In the case of a finished product in which it is desired to completely conceal the glass fibers, a plastic overlay 36 is initially applied to the mold surfaces in suitable thickness, such as two to twelve thousandths of an inch, and cured before insertion of the plastic sprayed mat covered core. Such overlay is preferably the same thermosetting plastic as that sprayed on the glass mat in order to provide a homogeneous final plastic coating. While the preferred plastic resins later described are generally classified as thermosetting, I have found them in practice to be slightly thermoplastic at curing temperatures and readily weldable when cured under heat in successive layers. Accordingly, while the overlay applied to the mold and cured before insertion of the glass fiber product prevents the glass fiber in the mat from penetrating to the product surface, the plastic applied to the mat when cured in direct contact with the heated overlay integrally unites with such overlay providing a final plastic coating for the insulation core as shown in Fig. 12 consisting of an outermost pure plastic overlay 23 integrally united with a plastic impregnated glass fiber mat 24 bonded (initially at 25) to the outer surface 26 of the glass fiber core. The addition of five to fifteen per cent of free styrene to the normally styrenated plastic resin has been found to materially assist in producing a complete integral weld with the overlay.

Since the plastic film applied to the outside of the glass mat completely covers the outer surface of such mat there is no tendency for any air inclusions to become entrapped between the overlay and the plastic surface of the glass mat. However, since some air is present within the glass mat after spraying the plastic coating thereon, the compression of the glass mat in the final mold requires that such air be permitted to escape into the core in order to avoid air pockets in the plastic coating per se. Accordingly, as previously mentioned it is desirable that the initial adhesive bond between the core and glass mat be made permeable to air by limiting the application of such adhesive to a relatively thin film.

The final mold and preform mold may be constructed with the same cavity dimensions corresponding to the final product size while the core 10, as shown in Fig. 1, is preferably cut substantially oversize in length and width, (for example, in the order of ⅛ inch per foot in the case of six pound per cubic foot batt material, and decreasing with higher densities), and approximately equal in thickness to the outer surface thickness of the final product. Thus, when the mat covered core is placed in the preform mold, the end grain of the core will interengage with the mat fibers due to the compression induced by the added thickness of the mat while the relatively more yielding side grain of the core will be relatively more substantially compressed. Since only the innermost fibers of the mat are wetted and bonded by the relatively light adhesive coating applied directly to the core, the mat covered core will expand slightly upon removal from the preform mold. This, together with the added thickness of any overlay applied to the final mold surfaces, will result in a further compression of the mat against the core in the final mold squeezing the liquid plastic sprayed on the outside of the mat and only partially impregnating the same, as shown in Fig. 9, down into contact with the surface of the core, forcing any air in the mat through the permeable adhesive coating 25 into the permeable core, and completely saturating the glass fiber mat with plastic as shown in Fig. 12.

Due to the compressibility and resilience of the core, such procedure results in a uniform pressure contact of the plastic saturated mat with the overlay on the mold surfaces assuring a uniform, smooth, integrally bonded plastic cover free of air inclusions, plastic starved areas in the mat or unbonded areas between the mat and core. In this connection, since the compressibility and resilience of the core is greater along the major plane (normal to fiber extension), it is desirable to locate all overlapping seams of the mat along the side surfaces as shown in Fig. 3 so that the extra thickness of material, shown in exaggerated form in Fig. 4, may be readily accommodated by localized additional compression of the core along such areas, thereby assuring a smooth flat exterior plastic surface after curing in the final mold. Standard batt densities ranging from four to twelve pounds per cubic foot have been successfully employed.

While glass fiber is preferred for both insulating core and cover it will be understood that other fibrous insulating materials such as felt might be substituted for the glass fiber core and similarly other fibrous materials such as flax, linen, or hemp might be substituted for the glass fiber reinforcing mat.

Suitable plastic material for overlay, mat and initial core coating include polyester, epoxy, phenalic or other thermosetting resins. Appropriate fillers such as calcium carbonate or china clay may be included in quantities for 0 to 60% by weight of the plastic mix. Catalysts such as benzol or methol ethyl ketone peroxide are desirably employed in quantities ranging from ½ to 2% of resin content, and suitable pigmentation for desired color may be employed either in the overlay alone or preferably in both outlay and mat coatings. Curing may be effected at temperatures ranging from 170° to 250° F. within two to ten minutes depending on the resin, temperature and catalyst employed, the curing time decreasing with increase of temperature and quantity of catalyst.

If it is desired to attach hardware directly to the insulation product, blind rivets or similar fastenings may be anchored to the reinforced plastic surface, or for greater strength without resort to heavy mat and plastic thickness, a relatively inexpensive hard board or similar insert may be employed in localized surface areas of the core to distribute fastening stresses over desired areas of the plastic shell. In order to eliminate core recessing operations for such inserts, an entire face of the core may be covered with such insert, suitable allowance being made for the thickness of such insert in cutting the core to proper size. Where such insert is employed, it should be bonded to both the core and the mat as by suitable application of plastic to the surfaces of such insert before wrapping with the mat.

The final mold illustrated in Figs. 10 and 11 is suitable for products having beveled surfaces providing an inner draft angle of 5° or more. If square surfaces are required in the finished product, I have found that a six-sided, progressively closable mold may be employed wherein oversize top and bottom mold surfaces are first brought into engagement with the product, followed by two overlength side mold surfaces which engage the closed top and bottom mold surfaces, and finally two end mold surfaces which engage both the closed top and bottom and side mold surfaces during closure to thus trap and press all plastic into the surface of the finished product.

From the above description it will be seen that an integrally molded insulation product has been provided which may be adapted for direct exposed use as a major component such as a door or wall in an insulation unit.

While preferred embodiments of such product and apparatus and method for manufacture have been described in detail, it will be understood that numerous modifications might be resorted to without departing from the scope of my invention as defined in the following claims.

I claim:

1. A structurally rigid insulation product comprising an interior core formed of a permeable fibrous batt composed of fibres lying in parallel planes normal to the major plane of the product and having substantially open interstices, and thermo-setting plastic impregnated fibrous mat material composed of fibres lying substantially in the planes of the product surfaces and substantially surrounding said core, the fibres of said batt and said mat material interengaging at the surface only of the core with the interengaging fibres being bonded to one another, and the plastic impregnated mat material forming a fibre-reinforced rigid structural shell completely enclosing the batt.

2. An insulation product comprising a core formed of a permeable fibrous material composed of fibres lying in parallel planes substantially normal to the major plane of the product and having substantially open interstices, means including a fibrous mat composed of multi-directional fibres lying substantially in the planes of the product surfaces and completely enveloping said core with overlapping marginal edges, and a thermo-setting plastic exterior layer overlying the outermost surface of said fibrous mat and extending thereinto to be integrally united therewith, said plastic layer providing a continuous, complete outer envelope integrally reinforced by said mat and bonded through the mat to the surface of said core, said envelope substantially protecting said core from and rendering the same impervious to moisture and air, and said integral outer layer, mat and inner core forming a structurally rigid article.

3. A structurally rigid insulation product comprising an interior core formed of a permeable glass fibre batt, the fibres of said batt lying in parallel planes substantially normal to the major plane of the product and having substantially open interstices, a glass fibre mat composed of fibres lying substantially in the planes of the product surfaces and completely surrounding said core with overlapping marginal edges, the fibres of said batt and said mat interengaging at the surface only of said core, a thermo-setting plastic completely permeating said mat, and forming, with said mat, a rigid, fibre-reinforced structural shell completely enclosing said batt and bonded thereto at said batt surface.

4. An insulation product comprising a core formed of a permeable glass fibre batt, the fibres of which lie in parallel planes substantially normal to the major plane of the product, a glass fibre mat completely enveloping said core with overlapping marginal edges, the fibres of said mat lying substantially in the planes of the product surfaces, the batt and mat fibres interengaging at the batt surface and being adhesively secured together, and a cured thermo-setting plastic exterior layer overlying the outermost surface of said fibrous mat and permeating the mat to be integrally united therewith, said mat and said plastic layer providing a continuous, fibre-reinforced, complete outer envelope to form a structurally rigid shell.

5. In a method of producing an insulating structural unit, the steps of forming a plurality of laminae of a permeable fibrous batt material, assembling said laminae to form a core in which the fibres are oriented to lie substantially in planes normal to the major plane of the unit, completely enclosing the core with fibrous matt material composed of multi-directional fibres impregnated with a thermo-setting plastic material to substantially fill the mat interstices thereof, and curing said thermo-setting material to form a dense, rigid impermeable envelope enclosing said core and connected to the surface thereof through the interengaging fibres of the core and of said mat material.

6. In a method of producing an insulating structural unit, the steps of forming a plurality of laminae of a permeable glass fibre batt, assembling said laminae so that the glass fibres are oriented to lie substantially in planes normal to the major plane of the unit, forming a core from said assembled laminae of the general shape and size of said unit, securing to all exposed surfaces of said core mat material of glass fibres composed of multi-directional fibres lying substantially in the planes of the unit surfaces, said mat material having overlapping marginal edges, surrounding said mat material with a layer of thermo-setting plastic, and curing said thermo-setting plastic to cause the same to permeate said mat material, forming a dense, rigid impermeable envelope enclosing said core.

7. A refrigerator door comprising a mass of temperature insulating material having substantially the shape and dimensions of the door, an envelope of permeable flexible material completely and snugly enclosing said mass, a thermoset plastic composition impregnating said envelope and bonding siad envelope to said mass, and an outer covering of thermoset plastic composition integrally connected with the impregnated envelope and completely enclosing the same, said thermoset composition being cured under heat and pressure to provide a rigid finished door.

8. A refrigerator door comprising a mass of blocks of fiber glass disposed so that the grain of the fiber glass extends transversely of the door, said mass having substantially the shape and dimensions of the door, an envelope of permeable flexible material completely and snugly enclosing said mass, a thermoset plastic composition impregnating said envelope and bonding said envelope to said mass, and an outer covering of thermoset plastic composition integrally connected with the impregnated envelope and completely enclosing the same, said thermoset composition being cured under heat and pressure to provide a rigid finished door.

9. The method of making a door for refrigerator use comprising forming a mass of insulating material shaped to conform substantially to the dimensions of the door, wrapping about said mass a mat of permeable material to form an envelope completely and snugly enclosing the insulating material, impregnating the entire envelope and the surface portion of the mass with a thermoset plastic composition, forming an outer coating of thermosetting composition completely enclosing the envelope and placing the coated impregnated envelope in a mold and subjecting the same to pressure at a temperature and for a time sufficient to cure the plastic composition and produce a rigid finished door.

References Cited in the file of this patent

UNITED STATES PATENTS

| | | |
|---|---|---|
| 672,214 | Kelly | Apr. 16, 1901 |
| 1,867,575 | Loetscher | July 19, 1932 |
| 2,446,038 | Amigo | July 27, 1948 |
| 2,448,114 | Olson et al. | Aug. 31, 1948 |
| 2,546,230 | Modigliani | Mar. 27, 1951 |
| 2,550,465 | Gorski | Apr. 24, 1951 |
| 2,630,868 | Ellenberger | Mar. 10, 1953 |
| 2,649,900 | Pfankuch | Aug. 25, 1953 |
| 2,678,686 | Schulz | May 18, 1954 |
| 2,731,682 | Evans | Jan. 24, 1956 |

FOREIGN PATENTS

| | | |
|---|---|---|
| 413,474 | France | May 27, 1910 |